(12) United States Patent
Wang et al.

(10) Patent No.: US 10,713,298 B2
(45) Date of Patent: Jul. 14, 2020

(54) VIDEO RETRIEVAL METHODS AND APPARATUSES

(71) Applicant: BEIJING ZHIGU RUI TUO TECH CO., LTD., Beijing (CN)

(72) Inventors: Meng Wang, Anhui (CN); Kuifei Yu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 218 days.

(21) Appl. No.: 15/570,964

(22) PCT Filed: May 10, 2016

(86) PCT No.: PCT/CN2016/081486
§ 371 (c)(1),
(2) Date: Oct. 31, 2017

(87) PCT Pub. No.: WO2016/180308
PCT Pub. Date: Nov. 17, 2016

(65) Prior Publication Data
US 2018/0293246 A1    Oct. 11, 2018

(30) Foreign Application Priority Data

May 13, 2015 (CN) .......................... 2015 1 0241286

(51) Int. Cl.
*G06F 16/70* (2019.01)
*G06F 16/78* (2019.01)
(Continued)

(52) U.S. Cl.
CPC .......... *G06F 16/7867* (2019.01); *G06F 16/70* (2019.01); *G06F 16/71* (2019.01); *G06N 5/02* (2013.01)

(58) Field of Classification Search
CPC ....................................................... G06F 16/00
See application file for complete search history.

(56) References Cited

U.S. PATENT DOCUMENTS 7,949,050 B2    5/2011  Xu et al.
8,218,859 B2 *  7/2012  Wang .................... G06K 9/6297
                                                         382/160
(Continued)

FOREIGN PATENT DOCUMENTS

CN        101281520 A    10/2008
CN        100520805 C     7/2009
(Continued)

OTHER PUBLICATIONS

Peng, Zhi-Peng et al., "An Ontology Concept-Based Cluster Partition Approach for Computing the Semantic Distance between Concepts," Pattern Recognition and Artificial Intelligence, vol. 24, No. 2, pp. 194-200, Apr. 30, 2011.
(Continued)

*Primary Examiner* — Khanh B Pham
(74) *Attorney, Agent, or Firm* — Sheppard Mullin Richter & Hampton LLP

(57) ABSTRACT

The present application discloses various video retrieval methods and apparatuses. One of the video retrieval methods comprises: determining a semantic concept group sequence according to video query information, the semantic concept group sequence comprising: at least two semantic concept groups and sequential information between different semantic concept groups therein, and each semantic concept group in the at least two semantic concept groups comprising at least one simple semantic concept; and retrieving videos at least according to the semantic concept group sequence. The technical solution provided in the present application can better meet actual application demands of complicated query of videos.

38 Claims, 5 Drawing Sheets

(51) Int. Cl.
*G06F 16/71* (2019.01)
*G06N 5/02* (2006.01)

(56) References Cited

U.S. PATENT DOCUMENTS

| | | | |
|---|---|---|---|
| 10,282,672 B1* | 5/2019 | Mishra | G06N 20/00 |
| 2002/0107827 A1* | 8/2002 | Benitez-Jimenez | G06F 16/40 706/59 |
| 2007/0094251 A1 | 4/2007 | Lu et al. | |
| 2010/0076984 A1 | 3/2010 | Papadopoullos et al. | |
| 2010/0125575 A1 | 5/2010 | Zaragoza | |
| 2013/0259375 A1* | 10/2013 | Dunlop | G06K 9/00684 382/173 |
| 2014/0369596 A1* | 12/2014 | Siskind | G06K 9/00751 382/158 |

FOREIGN PATENT DOCUMENTS

| | | |
|---|---|---|
| CN | 102902821 A | 1/2013 |
| CN | 103488781 A | 1/2014 |
| CN | 103778227 A | 5/2014 |

OTHER PUBLICATIONS

International Search Report and Written Opinion for Application No. PCT/CN2016/081486, dated Jul. 26, 2016, 8 pages.

* cited by examiner

VIDEO RETRIEVAL METHODS AND APPARATUSES

CROSS-REFERENCE TO RELATED APPLICATIONS

This application is a National Phase Application of International Application No. PCT/CN2016/081486, filed on May 10, 2016, which claims the benefit of priority to Chinese Patent Application No. 201510241286.7, filed on May 13, 2015, and entitled "Video Retrieval Methods and Apparatuses". Both of the above-referenced applications are incorporated into the present application by reference herein in their entirety.

TECHNICAL FIELD

The present application relates to the field of video retrieval technologies, and in particular, to various video retrieval methods and apparatuses.

BACKGROUND

With rapid development of computer and network technologies, the amount of multimedia data represented as videos on the Internet increases rapidly, and more and more people retrieve desired videos by inputting video query information on a search engine. However, it is very challenging to achieve rapid and correct video retrieval.

A retrieval method based on semantic concept detection of videos is one of the common methods of video retrieval, and the method generally achieves mapping from video underlying features to simple semantic concepts by means of machine learning means, for example, acquire positive and negative examples of a certain semantic concept, extract underlying visual features, train a dichotomous classification model, used as a simple semantic concept detector, index video content based on a video concept detection result of the simple semantic concept detector and by using a detected simple semantic concept, then map given video query information to one group of simple semantic concepts, that is, "video query information-simple semantic concept" mapping, and then combine detection results of the simple semantic concepts to return a query result, so as to achieve video retrieval based on semantic concepts. Further, it is also feasible to use the method to combine multiple queried simple semantic concepts mapped into a semantic concept group, and perform video retrieval based on a semantic concept group classification and detection model corresponding to the semantic concept group.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

The present application provides various video retrieval methods and apparatuses.

In one aspect, embodiments of the present application provide a video retrieval method, comprising:

determining a semantic concept group sequence according to video query information, the semantic concept group sequence comprising: at least two semantic concept groups and sequential information between different semantic concept groups therein, and each semantic concept group in the at least two semantic concept groups comprising at least one simple semantic concept; and retrieving videos at least according to the semantic concept group sequence.

In another aspect, the embodiments of the present application provide a video retrieval apparatus, comprising:

a semantic concept group sequence determination module, configured to determine a semantic concept group sequence according to video query information, the semantic concept group sequence comprising: at least two semantic concept groups and sequential information between different semantic concept groups therein, and each semantic concept group in the at least two semantic concept groups comprising at least one simple semantic concept; and a video retrieval module, configured to retrieve videos at least according to the semantic concept group sequence.

The technical solution according to the embodiments of the present application determines the semantic concept group sequence according to the video query information, retrieves videos at least according to the semantic concept group sequence, and thus obtains, based on retrieval, a retrieval result that reflects an overall correlation degree of videos and the video query information including semantics and sequences. That is to say, the technical solution according to the embodiments of the present application jointly takes multiple semantics represented by the video query information and sequential information between the multiple semantics as a basis of video retrieval, wherein the sequential information embodies scene change and other information of retrieval objects to some extent, to cause the obtained retrieval result to embody an overall correlation degree between videos and the video query information including semantics and sequences, which helps to increase accuracy of the retrieval result and better meets actual application demands of complicated query of videos.

These and other advantages of the present application will be more evident through the following detailed description about alternative embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Figure 1:
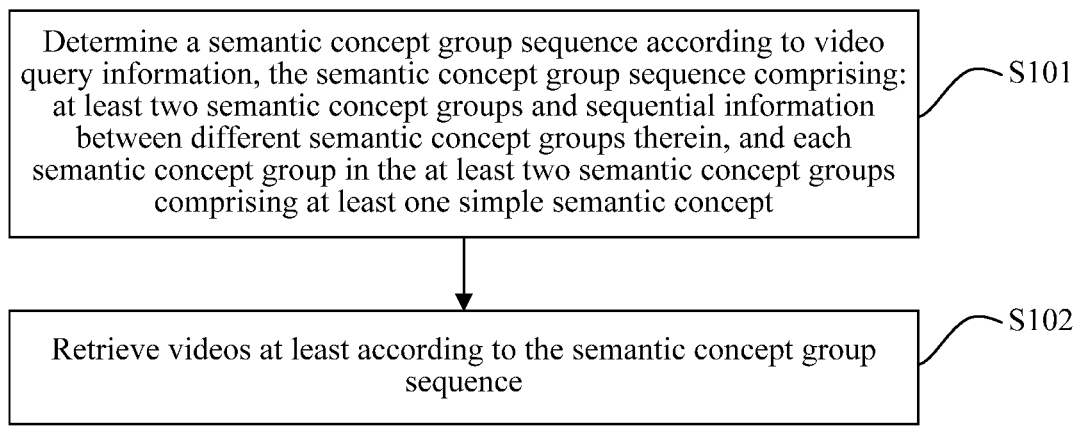
FIG. 1 is a flowchart of a video retrieval method according to an embodiment of the present application.

Those skilled in the art should understand that, elements in the drawings are merely illustrated for the sake of simplicity and clarity, and may not be drawn to scale. For example, sizes of certain elements in the drawings may be amplified relative to other elements, so as to help to improve the understanding about the embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementations of the present application are further described in detail hereinafter with reference to the accompanying drawings (in which the same elements are denoted by the same reference numerals) and embodiments. The following embodiments are intended to describe the present application, but not to limit the scope of the present application.

Those skilled in the art should understand that the terms such as "first" and "second" in the present application are merely used to distinguish different steps, devices or modules or the like, which neither represent any specific technical meanings nor represent a necessary logic sequence therebetween.

FIG. 1 is a flowchart of a video retrieval method according to an embodiment of the present application. An execution body of the video retrieval method according to the embodiment of the present application may be a certain video retrieval apparatus, and device manifestations of the video retrieval apparatus are not limited, for example, the video retrieval apparatus may be a certain separate device; or the video retrieval apparatus may be integrated, as a certain functional module, into a certain electronic device, and the electronic device may comprise, but is not limited to, smart terminals, search engine devices, servers and the like, which is not limited in the embodiment of the present application. Specifically, as shown in FIG. 1, a video retrieval method according to the embodiment of the present application comprises:

S101: Determine a semantic concept group sequence according to video query information, the semantic concept group sequence comprising: at least two semantic concept groups and sequential information between different semantic concept groups therein, and each semantic concept group in the at least two semantic concept groups comprising at least one simple semantic concept.

S102: Retrieve videos at least according to the semantic concept group sequence.

In the terms possibly used in the technical solution according to the embodiment of the present application:

(1) A simple semantic concept set comprises multiple simple semantic concepts, each simple semantic concept in the simple semantic concept set is equivalent to a traditional basic semantic concept, for example, WordNet can serve as an optional manifestation of the simple semantic concept set, and words comprised in the WordNet can be equivalent to respective simple semantic concepts; the respective simple semantic concepts in the simple semantic concept set respectively have corresponding respective simple semantic concept classification and detection models, and a video can be detected based on the respective simple semantic concept classification and detection models, to determine semantic similarities between the respective simple semantic concepts and the video (e.g., respective key frames of the video).

(2) A semantic concept group set comprises multiple semantic concept groups, and each semantic concept group in the semantic concept group set comprises at least two simple semantic concepts, that is to say, semantics corresponding to a combination of two or more simple semantic concepts are equivalent to semantics corresponding to a certain semantic concept group in the semantic concept group set; respective semantic concept groups in the semantic concept group set respectively have corresponding respective semantic concept group classification and detection models, and a video can be detected based on the respective semantic concept group classification and detection models, to determine semantic similarities between the respective semantic concept groups and the video (e.g., respective key frames of the video).

(3) The semantic concept group sequence is determined according to video query information, wherein the determined semantic concept group sequence comprises: at least two semantic concept groups and sequential information between different semantic concept groups in the at least two semantic concept groups, and each semantic concept group in the at least two semantic concept groups comprises at least one simple semantic concept, that is to say, a semantic concept group in a semantic concept sequence has a situation of comprising one simple semantic concept and a situation of comprising at least two simple semantic concepts, equivalent to that an association can be established between each semantic concept group in the semantic concept group sequence and a simple semantic concept in a simple semantic concept set or a semantic concept group in a semantic concept group set, which embodies the timing information between different semantic concept groups in the at least two semantic concept groups.

(4) Videos are objects of the video query information, and the meaning of the "video" in the present application should be understood in a broad sense, which is a general term of shots, scenes, short videos and the like, that is to say, time span involved in the video is flexible, the number of the shots or scenes comprised is not limited, a video may be partially the same as the video query information, and may also be wholly related to the video query information, and so on. In actual applications, it is feasible to adopt, but not limited to, schemes such as one of the shots or scenes or a combination thereof, to process the video wholly or partially, for example, a shorter video is not segmented; lens detection is performed for a longer video and then clustering is performed to obtain a scene; for a situation where sub-shot segmentation is performed on the video once again, it is feasible to extract key frames from each sub-shot. Each video can be represented with at least one key frame or at least one key frame sequence.

The inventor of the present application finds, in the process of implementing the embodiments of the present application, that video retrieval based on semantics generally considers respective simple semantic concepts separately for semantic similarity retrieval. For longer video query information, it is feasible to extract multiple simple semantic concepts therefrom and take the multiple simple semantic concepts as a semantic concept group for video retrieval. The method can obtain a better retrieval result in the event that the video query information is less complicated, however, if the video query information is more complicated, for example, in the event that the video query information comprises scene changes and the like, for example, "a man walks out of a car, walks into a bank" and other complicated video query information, the retrieval result is not good enough if respective simple semantic concepts or semantic concept groups are considered separately.

In order to support complicated query, the technical solution according to the embodiment of the present application determines the semantic concept group sequence according to the video query information, retrieves videos at least according to the semantic concept group sequence, and thus obtains, based on retrieval, a retrieval result that reflects an overall correlation degree of videos and the video query information including semantics and sequences. That is to say, the technical solution according to the embodiment of the present application jointly takes multiple semantics represented by the video query information and sequential information between the multiple semantics as a basis of video retrieval, wherein the sequential information embodies scene change and other information of retrieval objects to some extent, to cause the obtained retrieval result to embody an overall correlation degree between videos and the video query information including semantics and sequences, which helps to increase accuracy of the retrieval result and better meets actual application demands of complicated query of videos.

The video query information may be a certain query method input by a user online or a certain piece of query information preset and the like. By analyzing at least one of keyword, part of speech, grammar, clause and the like of the video query information, a semantic concept group sequence corresponding to the video query information can be determined, and a specific determination method of the semantic concept group sequence is very flexible, which is not limited in the embodiment of the present application.

Optionally, the determination method of the semantic concept group sequence comprises: determining at least two simple semantic concepts and sequential information between different simple semantic concepts therein according to the video query information; determining the at least two semantic concept groups, wherein sequential information corresponding to simple semantic concepts comprised in the same semantic concept group in the at least two semantic concept groups is the same, and sequential information corresponding to simple semantic concepts comprised in different semantic concept groups are different; and determining the semantic concept group sequence according to the at least two semantic concept groups and the sequential information between the different semantic concept groups therein. The scheme is equivalent to determining simple semantic concepts and corresponding sequential information thereof from the video query information and combining determined simple semantic concept groups into a semantic concept group according to the sequential information, in this way, the at least two semantic concept groups and the sequential information corresponding to the different semantic concept groups therein can be obtained, that is, the semantic concept group sequence is obtained, and the semantic concept group sequence is adopted for video retrieval, which helps to establish association between high-level semantics of the video query information and underlying information of video content, causes a retrieval result to be capable of reflecting the overall correlation degree of videos and the video query information including semantics and sequences, and thus increases accuracy of the retrieval result.

Optionally, the determining at least two simple semantic concepts according to the video query information comprises: extracting at least two keywords according to the video query information; determining semantic similarities between the video query information and multiple simple semantic concepts comprised in a simple semantic concept set respectively at least according to the at least two keywords; and determining the at least two simple semantic concepts whose semantic similarities meet a predetermined condition in the simple semantic concept set. The scheme can effectively extract semantic concepts in the video query information. It is possible to use content words and/or function words in the video query information as keywords according to actual retrieval needs, wherein the content words may comprise, but are not limited to, nouns, verbs, adjectives, pronouns, quantifiers and the like, and the function words may comprise, but are not limited to, prepositions, conjunctions and the like. As the content words have substantial meanings, extracting the content words in the video query information as keywords can better represent semantics of the video query information. After the at least two keywords of the video query information are extracted, it is feasible to adopt, but not limited to, the existing matching method of integrating semantic ontology to respectively associate each keyword extracted in video query information Q and respective simple semantic concepts in a simple semantic concept set Ω with WordNet, respectively calculate distances (e.g., WordNet distances or Google distances) between each keyword extracted in the video query information Q and the respective simple semantic concepts in the simple semantic concept set Ω, and determine, according to the distances, semantic similarities between the video query information Q and the respective simple semantic concepts in the simple semantic concept set Ω; afterwards, it is feasible to determine at least two simple semantic concepts in the simple semantic concept set Ω according to a predetermined condition, wherein the predetermined condition can be determined according to actual needs, for example, the predetermined condition may comprise, but is not limited to, a semantic similarity threshold ζ, simple semantic concepts whose semantic similarities are greater than the threshold are extracted out as a basis of determining a semantic concept group, by taking the video query information "a man walks out of a car, walks into a bank" as an example, three keywords "man", "car" and "bank" can be extracted, m simple semantic concepts <$C_1$, $C_2$, . . . , $C_m$> having greater semantic similarities with the video query information in the simple semantic concept set are determined according to the three keywords, wherein the keywords and the simple semantic concepts may be the same and may also have an associated corresponding relationship, and it can be understood that they may one-to-one correspond to each other, but they are not required to one-to-one correspond to each other.

In actual applications, if the video query information comprises evident sequential information, it is simpler to extract the sequential information in this case; if the video query information does not comprise evident sequential information, it is necessary to obtain implicit sequential information of the video query information by analyzing word, part of speech, grammar and other analysis on the video query information per se.

Optionally, the determining sequential information between different simple semantic concepts in the at least two simple semantic concepts according to the video query information comprises: analyzing conjunctions comprised in the video query information; and determining the sequential information of different simple semantic concepts in the at least two simple semantic concepts according to an analysis result of the conjunctions. Conjunctions are function words used to connect words, phrases or sentences and indicating a certain logical relationship such as juxtaposition or continuity. If the video query information comprises a conjunction, it is feasible to analyze a logical relationship indicated by the conjunction, to determine that the conjunction indicates a logical relationship such as juxtaposition or continuity, in this way, in combination with word orders of corresponding respective keywords of the at least two simple semantic concepts in the video query information, the sequential information of different simple semantic concepts in the at least two simple semantic concepts can be determined, by taking the video query information "a man walks out of a car, then walks into a bank" as an example, simple concepts that can be determined comprise "man", "car" and "bank", sequential information is analyzed based on the conjunction "then", it is feasible to cluster simple semantic concepts corresponding to the same sequential information into the same semantic concept group and cluster simple semantic concepts corresponding to different sequential information into different semantic concept groups, and a semantic concept sequence obtained can be represented as "<man, car>, <bank>". The scheme is simple and easy to implement, and has an analysis result with high accuracy.

Optionally, the determining sequential information between different simple semantic concepts in the at least two simple semantic concepts according to the video query information comprises: performing part-of-speech statistic analysis on different clauses comprised in the video query information respectively; and determining the sequential information of different simple semantic concepts in the at least two simple semantic concepts according to a part-of-speech statistic analysis result. For example, it is feasible to extract part-of-speech histogram and other features from each clause comprised in the video query information, establish a classifier by using a method such as statistical learning, judge whether a sequential relationship exists between different clauses of the video query information, if yes, according to the sequential relationship, in the at least two simple semantic concepts determined, cluster simple semantic concepts corresponding to the same sequential information into the same semantic concept group and cluster simple semantic concepts corresponding to different sequential information into different semantic concept groups, thereby obtaining the semantic concept sequence. The scheme can effectively extract implicit sequential information in the video query information.

After the semantic concept group sequence corresponding to the video query information is acquired, videos can be retrieved at least according to the semantic concept group sequence, for example, it is feasible to determine semantic similarities and sequential similarities between multiple videos comprised in a video library and the video query information at least according to the semantic concept group sequence, to obtain a retrieval result. The video library comprises multiple videos. The semantic similarity between each video and the video query information, mainly from the perspective of matching of the semantic concept group, determines correlation degrees between semantic concepts corresponding to key frames of a video and the video query information; the sequential similarity between each video and the video query information, mainly from the perspective of sequential matching between different semantic concept groups, determines correlation degrees of a sequential relationship between semantic concepts respectively corresponding to different key frames in a key frame sequence of the video and the video query information. For example, by taking the video query information "a man walks out of a car, walks into a bank" as an example, it is feasible to, from the perspective of matching of semantic concepts corresponding to key frames of a video with a semantic concept group "<man, car>" or "<bank>", reflect semantic relevance between the video and the video query information; it is feasible to, from the perspective of matching of an appearing order of semantic concepts respectively corresponding to different key frames in a key frame sequence of the video with a sequence "<man, car>, <bank>" of different semantic concept groups in a semantic concept group sequence, reflect sequential relevance between the video and the video query information. Thus, the scheme, in a period of performing video retrieval on the video library, jointly takes multiple semantics represented by the video query information and sequential information between the multiple semantics as a basis of video retrieval, to cause the obtained retrieval result to not only embody semantic similarities between videos and the video query information but also embody sequential similarities between the videos and the video query information, that is, embody an overall correlation degree between the videos and the video query information including semantics and sequences, which helps to increase accuracy of the retrieval result and better meets actual application demands of complicated query of videos.

The technical solution according to the embodiment of the present application determines a retrieval result from two dimensions, i.e., semantics and sequence, and implementation means of specific retrieval thereof is very flexible.

Optionally, it is feasible to determine the semantic similarity and the sequential similarity between the any video and the video query information according to semantic similarities between respective key frames in a key frame sequence comprised in the any video in the video library and multiple semantic concept groups comprised in a semantic concept group set and/or multiple simple semantic concepts comprised in the simple semantic concept set, sequential information between multiple key frames comprised in the any video and the semantic concept group sequence. Each video in the video library can be indicated as at least one key frame or at least one key frame sequence, semantic similarities between key frames of each video and multiple semantic concept groups comprised in a semantic concept group set and/or multiple simple semantic concepts comprised in the simple semantic concept set can be pre-acquired, sequential information between different key frames of each video is known, and relevance between each video and at least two semantic concept groups comprised in the semantic concept group sequence and sequential information between different semantic concept groups therein can be determined in combination with the above information, thereby obtaining the semantic similarity and the sequential similarity between each video and the video query information. for example, by using a statistical learning method, simple semantic concepts or semantic concept groups respectively corresponding to respective key frames in a key frame sequence comprised in a video are compared respectively with the at least two semantic concept groups comprised in the semantic concept group sequence, and sequential information between the simple semantic concepts or semantic concept groups respectively corresponding to the corresponding key frames in the video is determined according to sequential information between different key frames, and the sequential information is compared with sequential information between different semantic concept groups in the at least two semantic concept groups comprised in the semantic concept group sequence, to obtain the semantic similarity and the sequential similarity between each video and the video query information according to statistical values or weighted statistical values of various comparison results. The scheme takes semantic similarities between a video in a video library and simple semantic concepts in a simple semantic concept set and/or semantic concept groups in a semantic concept group as intermediate features of video retrieval, and performs retrieval in combination with sequential information, to cause simple semantic concepts or semantic concept groups corresponding to different key frames of the video to establish an association therebetween, thus reducing a semantic gap between underlying features of the video and high-level semantics of the video query information and increasing accuracy of a video retrieval result.

Further optionally, during video retrieval, it is feasible to determine at least two adjacent key frames of the any video as a key frame sequence; the scheme is equivalent to, by using sliding-window statistical learning manner, for example, a key frame sequence is determined in a video based on a sliding window, making corresponding comparison with the semantic concept group sequence based on the key frame sequence, after completion of comparison, it is feasible to move the sliding window backward to determine another key frame sequence and then make corresponding comparison with the semantic concept group sequence based on the key frame sequence, and the semantic similarity and the sequential similarity between each video and the video query information can be obtained by integrating comparison results. Key frames respectively comprised in two adjacent key frame sequences determined may be entirely different or partially the same. Use of the scheme helps to determine key frame sequences with similar or the same lengths in videos of the video library as objects of similarity retrieval, unifies comparison standards, and thus helps to increase accuracy of a retrieval result.

Optionally, it is also feasible to determine semantic similarities and sequential similarities between multiple videos comprised in a video library and the video query information based on a modeling manner, to increase accuracy of the retrieval result, and a modeling method, for example, may comprise S201-S203.

S201: Determine a first training example set in the multiple videos comprised in the video library at least according to the semantic concept group sequence by using a heuristic method.

It is feasible to, according to semantic similarities of multiple simple semantic concepts in a simple semantic concept set of pre-acquired videos and/or semantic similarities of multiple semantic concept groups in a semantic concept group set, collect a first training example set corresponding to the semantic concept group sequence by using a heuristic method, the first training example set comprises multiple positive examples and multiple negative examples, and in the first training example set, the positive examples refer to videos of which both semantic similarities and sequential similarities are very high, and the negative examples refer to videos of which at least one of semantic similarities and sequential similarities is lower.

By taking a semantic concept group sequence "<man, car>, <bank>" as an example, example collection is performed by using a heuristic method, wherein collection of positive examples is as follows, for example, if "{man, car}" in the former key frame in a certain video has high detection confidence (e.g., higher than a certain threshold or ranking in the top few places) and "{bank}" in the latter key frame in the video also has high detection confidence, the video can be taken as a positive example. On the contrary, if "{man, car}" in the former key frame in a certain video has low detection confidence (e.g., lower than a certain threshold or ranking lower) and/or "{bank}" in the latter key frame in the video has low detection confidence, the video can be taken as a negative example.

S202: Construct a first Hidden Markov Model (HMM) corresponding to the video query information according to the first training example set.

Examples comprised in the first training example set are respectively indicated through a key frame sequence, and optionally, each key frame in each key frame sequence corresponds to one semantic concept group (e.g., "{man, car}") or corresponds to one simple semantic concept (e.g., "{bank}").

A HMM is a statistical model based on Markov chain, usually used to model sequential data. The embodiment of the present application can indicate key frame sequences corresponding to the examples comprised in the first training example set respectively with a HMM H, each HMM may be indicated with a five-tuple of "two state sets and three probability matrixes", and the five-tuple comprises: an implicit state set, an observable state set, an initial probability matrix, a matrix of transition probability between implicit states, and a Confusion Matrix (which may also be referred to as a matrix of transition probability of observation state); optionally, semantic concepts (e.g., simple semantic concepts and/or semantic concept groups) correspond to implicit states in the implicit state set, video underlying features corresponding to the semantic concepts correspond to observable states in the observable state set, the initial probability matrix may be assigned with a value according to needs (e.g., average or random assignment), and transition probabilities between different semantic concepts can be reflected through the matrix of transition probability between implicit states. In this way, it is feasible to adopt, but not limited to, the existing Baum-welch algorithm to train the HMMs respectively corresponding to the examples comprised in the first training example set, thus obtaining a HMM (which might as well be called first HMM) corresponding to the video query information.

S203: Determine probability distribution distances between second HMMs corresponding to the multiple videos comprised in the video library and the first HMM, to obtain the semantic similarities and the sequential similarities between the multiple videos comprised in the video library and the video query information.

The key frame sequences comprised in the videos in the video library may be expressed respectively through HMMs, and HMMs corresponding to the videos might as well be called second HMMs. By comparing probability distribution distances between second HMMs corresponding to the multiple videos in the video library and the first HMM corresponding to the video query information, the semantic similarities and the sequential similarities between the multiple videos comprised in the video library and the video query information can be obtained, that is to say, the sizes of the probability distribution distances reflect semantic similarities and sequential similarities between underlying features of the videos and high-level features of the video query information to some extent.

The probability distribution distances may comprise, but are not limited to, KL divergence (Kullback-Leibler Divergence, KLD for short), use of the KL divergence can facilitate similarity measurement of two HMMs, specifically, KL divergence between two HMMs can be determined according to the following formula, for example, an upper limit determined by the following formula can be used as a distance between a first HMM and a second HMM:

$$KLD(H^u, H^v) \leq \sum_{i=1}^{S} \left\{ \frac{1}{1-a_{ii}} \sum_{e=1}^{K} \pi_{ie}(\mu_{ie}^u - \mu_{ie}^v)^T \Sigma_{ie}^{-1}(\mu_{ie}^u - \mu_{ie}^v) \right\} \quad (1)$$

In the formula (1), $H^u$ indicates a first HMM corresponding to the video query information, $H^v$ indicates a second HMM corresponding to a key frame sequence of a certain video, $KLD(H^u, H^v)$ indicates KL divergence between the first HMM and the second HMM, and S indicates the total number of implicit states; the ith implicit state is indicated by a Gaussian mixture model comprising K Gaussian components $\{\pi_{i1}, \pi_{i2}, \ldots, \pi_{iK}; \mu_{i1}, \mu_{i2}, \ldots, \mu_{iK}; \Sigma_{i1}, \Sigma_{i2}, \ldots, \Sigma_{iK}\}$, wherein $\pi_{ie}$ indicates a coefficient of the eth Gaussian component in a Gaussian mixture model corresponding to the ith implicit state, $\mu_{ie}^u$ indicates a mean vector of the eth Gaussian component in a Gaussian mixture model u corresponding to the ith implicit state, $\mu_{ie}^v$ indicates a mean vector of the eth Gaussian component in a Gaussian mixture model v corresponding to the ith implicit state, and $\Sigma_{ie}$ indicates a covariance matrix of the eth Gaussian component in a Gaussian mixture model corresponding to the ith implicit state.

Further, it is feasible to label the examples comprised in the first training example set, for example, positive examples and negative examples, the formula (1) is improved in combination with label information of the positive and negative examples, and the improved KLD determination formula is as follows:

$$d(H^u, H^v) = \sum_{i=1}^{S} \left\{ \frac{1}{1-a_{ii}} \sum_{e=1}^{K} \pi_{ie}(\mu_{ie}^u - \mu_{ie}^v)^T A^T \Sigma_{ie}^{-1} A(\mu_{ie}^u - \mu_{ie}^v) \right\} \quad (2)$$

In the formula (2), A may be set as a unit matrix according to actual needs; or A may be a transition matrix comprising the label information of the positive and negative examples in the first training example set obtained through optimization learning based on semantic neighborhood preserving criterion, for example, it is feasible to use the existing gradient descent method in the field of machine learning to perform optimization solution on A, to achieve the largest interval discrimination between the positive and negative examples. The scheme determines KL divergence in combination with the label information of the positive and negative examples in the first training example set, and increases discrimination types, to cause a neighbor found according to the KL divergence determined by the formula (2) for each video (video clip) to be consistent (that is, relevant or irrelevant to each other) with a relevance label of the video clip. The process can cause judgment of relevance and irrelevance between the video clip and the query not to be confused easily, so as to obtain higher retrieval precision.

The implementation manner of using KL divergence as the probability distribution distance is easy. In addition, it is also feasible to use another distance, for example, a KL divergence average value or weighted value as the probability distribution distance, in other words, KL divergence between two HMMs determined has asymmetry, that is, KL divergence from A HMM to B HMM may be different from KL divergence from B HMM to A HMM, and it is feasible to calculate the two KL divergence respectively to obtain an average value or a weighted value, and the average value or the weighted value is used as the probability distribution distance, to measure the semantic similarity and the sequential similarity between the two HMMs, thereby helping to increase accuracy of the retrieval result.

In the technical solution according to the embodiment of the present application, the second HMMs corresponding to the videos in the video library may be pre-acquired in an offline stage, and may also be acquired in an online stage, and the implementation manner is very flexible, which is not limited in the embodiment of the present application. Optionally, before a probability distribution distance between a second HMM corresponding to any video comprised in the video library and the first HMM is determined, the method further comprises: determining the second HMM corresponding to the any video according to semantic similarities between multiple key frames comprised in the any video in the video library and multiple semantic concept groups comprised in a semantic concept group set and/or multiple simple semantic concepts comprised in the simple semantic concept set and sequential information between the multiple key frames comprised in the any video. The second HMM corresponding to the any video may be indicated with a five-tuple of "two state sets and three probability matrixes", and the five-tuple comprises: an implicit state set, an observable state set, an initial probability matrix, a matrix of transition probability between implicit states, and a Confusion Matrix; optionally, semantic concepts (e.g., simple semantic concepts and/or semantic concept groups) correspond to implicit states in the implicit state set, video underlying features corresponding to the semantic concepts correspond to observable states in the observable state set, the initial probability matrix may be assigned with a value according to needs (e.g., average or random assignment), and transition probabilities between different semantic concepts can be reflected through the matrix of transition probability between implicit states. The scheme can take semantic relevance between respective key frames of any video in the video library and semantic concepts (e.g., simple semantic concepts and/or semantic concept groups) as intermediate features, and indicates a HMM of a key frame sequence of the video in combination with sequential information between different key frames of the video, the method is simple and easy to implement, and after the video is indicated as a HMM (second HMM), it is convenient to measure a probability distribution distance with the first HMM corresponding to the complicated query information.

The semantic relevance and the sequential relevance between videos obtained by using any technical solution according to the embodiment of the present application as retrieval objects and the video query information are retrieval results. After the retrieval results are obtained, the retrieval results can be output, wherein an output manner of the retrieval results can be determined according to actual needs, which is not limited in the embodiment of the present application, for example, it is feasible to directly output the semantic relevance and the sequential relevance between the videos and the video query information, or it is feasible to wholly or partially output the semantic relevance and the sequential relevance after the semantic relevance and the sequential relevance are sorted, or it is feasible to indicate the semantic relevance and the sequential relevance between the videos and the video query information with certain parameter values and perform direct output or sorted output according to sizes of the parameter values, and so on, and the implementation manner is very flexible.

In addition, in the technical solution according to the embodiment of the present application, the simple semantic concept set, the semantic concept group set, and semantic relevance between multiple simple semantic concepts comprised in the simple semantic concept set and/or multiple semantic concept groups comprised in the semantic concept group set and key frames of the video may be pre-acquired, for example, it is feasible to use data of the video library already having the above information, or it is feasible to determine the semantic relevance before the corresponding video retrieval based on the video query information, which is not limited in the embodiment of the present application.

Optionally, before the retrieving videos at least according to the semantic concept group sequence, the method further comprises: determining semantic similarities between multiple videos comprised in the video library and multiple semantic concept groups comprised in a semantic concept group set. The scheme, before the corresponding video retrieval is performed based on the video query information, determines semantic similarities between multiple videos comprised in the video library and multiple semantic concept groups comprised in a semantic concept group set, and thus the semantic similarities can be taken as intermediate features of subsequently retrieving the videos according to the semantic concept group sequence, thereby increasing the speed of video online retrieval.

The determining semantic similarities between multiple videos comprised in the video library and any semantic concept group comprised in the semantic concept group set may comprise: detecting multiple key frames of the multiple videos comprised in the video library respectively by using a semantic concept group classification and detection model corresponding to any semantic concept group comprised in the semantic concept group set, to obtain semantic similarities between the multiple key frames of the multiple videos and the any semantic concept group. The semantic similarities obtained in the scheme are taken as intermediate features of subsequently retrieving the videos according to the semantic concept group sequence, thereby increasing the speed of video online retrieval.

Semantic concept groups in the semantic concept group set respectively have corresponding respective semantic concept group classification and detection models, and the videos can be detected based on the respective semantic concept group classification and detection models, to determine semantic similarities between the semantic concept groups and the videos (key frames of the videos). The semantic concept group classification and detection model corresponding to any semantic concept group in the semantic concept group set may adopt the existing classifier corresponding to the corresponding semantic concept group and other semantic concept detection models, and it is also feasible to construct a semantic concept detection model with higher performance according to actual needs to increase accuracy of a detection result.

For example, a semantic concept detection model corresponding to the semantic concept group can be constructed in combination with simple semantic concept classification and detection models respectively corresponding to the multiple simple semantic concepts comprised in the semantic concept group. Optionally, before the detecting multiple key frames of the multiple videos comprised in the video library respectively by using a semantic concept group classification and detection model corresponding to any semantic concept group comprised in the semantic concept group set, the method further comprises: determining multiple marked second training examples from semantic similarities between respective key frames comprised in multiple videos of at least one data source and multiple simple semantic concepts comprised in the simple semantic concept set; determining unmarked second training examples from the multiple videos comprised in the video library; and determining a semantic concept group classification and detection model of the any semantic concept group according to each second training example.

The second training example set of any semantic concept group in the semantic concept group set comprises multiple positive examples and multiple negative examples, in the second training example set, the positive examples are videos comprising key frames (e.g., with higher semantic similarity) corresponding to simple semantic concepts in the semantic concept group, and the negative examples are videos at least not comprising key frames corresponding to at least one simple semantic concept in the semantic concept group. Data sources of the positive and negative examples in the second training example set may be one or more, the data sources may comprise, but are not limited to, the Internet and/or a video library to be retrieved, and multiple marked second training examples are determined from semantic similarities between respective key frames comprised in multiple videos of at least one data source and multiple simple semantic concepts comprised in the simple semantic concept set; then unmarked second training examples are determined from the multiple videos comprised in the video library; and the number of the unmarked second training examples is much greater than the number of the marked second training examples, that is, a small number of second training examples are precisely marked, unmarked and marked second training examples are the second training example set, and a semantic concept group classification and detection model is determined respectively according to the second training examples of the second training example set. The scheme can enrich data sources of example acquisition, and can combine a small number of precisely marked examples and unmarked examples into a training example set of a semantic concept group classification and detection model, which helps to use a less amount of processing to acquire a detector with higher performance.

Optionally, it is feasible to use the following formula to determine a semantic concept group classification and detection model corresponding to any semantic concept group;

$$(g, \beta) = \arg\min_{g,\beta} \sum_{q=1}^{t} \beta_q D(g, f^q) + \eta_1 L(g, Z_L, y_b) + \eta_2 R_3(g, Z_L, Z_U) + \eta_3 R_4(\beta) + \eta_4 R_5(g) \quad (3)$$

In the formula (3), $f^1, f^2, \ldots, f^t$ indicates simple semantic concept classification and detection models respectively corresponding to t simple semantic concepts comprised in a certain semantic concept group; g indicates a semantic concept group classification and detection model corresponding to the semantic concept group; a weight vector $\beta(\beta_1, \beta_2, \ldots, \beta_t), \Sigma_{s=1}^{t}\beta_s=1$, the t weight vectors can be used to automatically adjust effect sizes of respective semantic concept detectors in semantic concept group detection; $\eta_1$, $\eta_2$, $\eta_3$ and $\eta_4$ are four non-negative weight parameters, and $\Sigma_{s=1}^{4}\eta_s=1$; $D(g,f^q)$ indicates an offset between the semantic concept group classification and detection model g and the model $f^q$ of the qth simple semantic concept comprised in the semantic concept group; $L(g,Z_L,y_b)$ indicates a loss item of the semantic concept group classification and detection model g in marked second training example data $(Z_L,y_b)$; $R_3(g,Z_L,Z_u)$ indicates regularization of the semantic concept group classification and detection model g in marked second training example data $(Z_L,y_b)$ and unmarked second training example data $Z_U$; $R_4(\beta)$ indicates regularization of the weight vector; and $R_5(g)$ indicates regularization of the whole model complexity.

The semantic concept group established according to the formula (3) represents public information of multiple simple semantic concepts comprised in the semantic concept group, which can be better in line with semantic characteristics of the semantic concept group.

Further, after the detecting multiple key frames of any video comprised in the video library respectively by using a semantic concept group classification and detection model corresponding to any semantic concept group comprised in the semantic concept group set, the method may further comprise: performing associative processing on multiple adjacent key frames according to semantic similarities between the multiple adjacent key frames comprised in the any video and the any semantic concept group. Sizes of the videos in the video library are not the same, some videos have greater time span, a video may have multiple adjacent key frames within a certain time period which respectively have higher semantic similarities with a certain semantic concept group, to this end, it is feasible to associate multiple key frames respectively having higher semantic relevance with the same semantic concept group, and in this way, when intermediate features of the semantic concept group sequence are retrieved based on a semantic similarity between the video and the semantic concept group, it is feasible to take the associated multiple key frames as a whole for comparison, to increase the speed of retrieval.

Optionally, before the retrieving videos at least according to the semantic concept group sequence, the method further comprises: determining semantic similarities between multiple videos comprised in the video library and multiple simple semantic concepts comprised in the simple semantic concept set. The scheme, before the corresponding video retrieval is performed based on the video query information, determines semantic similarities between multiple videos comprised in the video library and multiple simple semantic concepts comprised in the simple semantic concept set, and thus can take the semantic similarities as intermediate features of subsequently retrieving the videos according to the semantic concept group sequence, thereby increasing the speed of video online retrieval.

The determining semantic similarities between multiple videos comprised in the video library and any simple semantic concept comprised in the simple semantic concept set may comprise: detecting multiple key frames of the multiple videos comprised in the video library respectively by using a simple semantic concept classification and detection model corresponding to the any simple semantic concept comprised in the simple semantic concept set, to obtain semantic similarities between the multiple key frames of the multiple videos and the any simple semantic concept. The semantic similarities obtained in the scheme can be taken as intermediate features of subsequently retrieving the videos according to the semantic concept group sequence, thereby increasing the speed of video online retrieval.

The simple semantic concepts in the simple semantic concept set respectively have corresponding respective simple semantic concept classification and detection models, and videos can be detected based on the respective simple semantic concept classification and detection models, to determine semantic similarities between the simple semantic concepts and the videos (e.g., key frames of the videos). A simple semantic concept classification and detection model corresponding to any simple semantic concept in the simple semantic concept set may use the existing common detector (e.g., Columbia374, Vireo374 and the like) corresponding to the corresponding simple semantic concept, and it is also feasible to construct a simple semantic concept classification and detection model with higher performance according to actual needs to increase accuracy of a detection result.

For example, before the detecting multiple key frames of any video comprised in the video library respectively by using a simple semantic concept classification and detection model corresponding to the any simple semantic concept comprised in the simple semantic concept set, the method may further comprise: acquiring multiple third training examples of the any simple semantic concept from at least one data source; marking at least part of the multiple third training examples; and determining the simple semantic concept classification and detection model corresponding to the any simple semantic concept according to the at least part of the multiple third training examples marked.

The third training example set of any simple semantic concept in the simple semantic concept set comprises multiple positive examples and multiple negative examples, in the third training example set, the positive examples are videos comprising key frames (e.g., with higher semantic similarity) corresponding to the simple semantic concept, and the negative examples are videos not comprising the key frames corresponding to the simple semantic concept. Data sources of the positive and negative examples in the third training example set may be one or more, more data sources mainly refer to obtaining training examples of the simple semantic concept through multiple channels such as image retrieval and video retrieval, when extraction of video underlying features is performed on the training examples, it is feasible to use, but not limited to, multimoding features to describe video content, and the multimoding features may comprise, but are not limited to, at least one of the followings or any combination: color histogram, edge histogram, wavelet texture features, bag of visual words and other features extracted from the key frames of the video; motion vector features extracted from shots of the video; and supervector features obtained after Gaussian mixture model modeling is performed on Mel frequency cepstral coefficients extracted from audio clips of the video. After the training examples are acquired, it is feasible to precisely mark a small number of the examples comprised in the third training example set, and then train a simple semantic concept classification and detection model corresponding to the simple semantic concept based on the third training example set.

For example, for a simple semantic concept, it is feasible to manually mark a partial high-precision example $(X_L,y)$, wherein $X_L=\{x_L^r\}_{r=1}^N$, $y=\{y^r\}_{r=1}^N$; $1 \leq r \leq N$, N indicates the number of the partial high-precision example; $\{y^r\}_{r=1}^N$ indicates a label of the partial high-precision example, when $y^r$ is equal to 1, it indicates that the example $x_L^r$ is a positive example, and when $y^r$ is equal to $-1$, it indicates that the example $x_L^r$ is a negative example. Afterwards, it is feasible to use a regularization statistical learning method shown by the following formula to learn the final simple semantic concept detection model f corresponding to the simple semantic concept:

$$(f_0, w) = \arg\min_{f_0, a} L(f, X_L, y) + \lambda R_1(w) + \mu R_2(f_0) \qquad (3)$$

In the formula (3), a weight vector $w=(w_1, w_2, \ldots, w_n)$, $\Sigma_{s=1} w_s = 1$; $\lambda$ and $\mu$ indicate two weighting parameters, and it is feasible to make presetting according to a general situation of data in a test; $L(f, X_L, y)$ indicates a loss item of the model f on a high-precision example $(X_L, y)$, $R_1(w)$ indicates regularization of the weight vector; and $R_2(f_0)$ indicates regularization of complexity of a new model $f_0$ to be learned.

After $f_0$ and w are obtained through learning based on the formula (3), a final simple semantic concept detection module corresponding to the simple semantic concept can be obtained according to the following formula:

$$f = f_0 + \Sigma_{s=1}^n w_s f_s \qquad (4)$$

In the formula (4), $w_s$ is the weight of the model $f_s$, f indicates the final simple semantic concept detection module corresponding to the simple semantic concept, the model may be indicated as a combination of detection models of the existing n–k simple semantic concepts C, a weighted sum of concept detection models of learned k different data sources and a new model $f_0$ to be learned.

The scheme can enrich data sources of example acquisition, and can combine a small number of precisely marked examples and unmarked examples into a training example set of a simple semantic concept classification and detection model, which helps to use a less amount of processing to acquire a detector with higher performance.

Further, after the detecting multiple key frames of any video comprised in the video library respectively by using a simple semantic concept classification and detection model corresponding to the any simple semantic concept comprised in the simple semantic concept set, the method may further comprise: performing associative processing on multiple adjacent key frames according to semantic similarities between the multiple adjacent key frames comprised in the any video and the any simple semantic concept. Sizes of the videos in the video library are not the same, some videos have greater time span, a video may have multiple adjacent key frames within a certain time period which respectively have higher semantic similarities with a certain simple semantic concept, to this end, it is feasible to associate multiple key frames respectively having higher semantic relevance with the same simple semantic concept, and in this way, when semantic concept group modeling is performed and/or intermediate features of the semantic concept group sequence are retrieved based on a semantic similarity between the video and the simple semantic concept, it is feasible to take the associated multiple key frames as a whole for comparison, to increase the speed of retrieval.

It should be understood by those skilled in the art that, in any one of the foregoing methods of the specific implementations of the present application, the value of the serial number of each step does not mean an execution sequence, and the execution sequence of each step should be determined according to the function and internal logic thereof, and should not be any limitation to the implementation procedure of the specific implementations of the present application. In addition, even if multiple information acquired is described in the serial number of a certain step, it does not mean that the information is acquired synchronously, which should be determined according to the function and internal logic thereof and should not be any limitation to the implementation procedure of the specific implementations of the present application.

Figure 2:
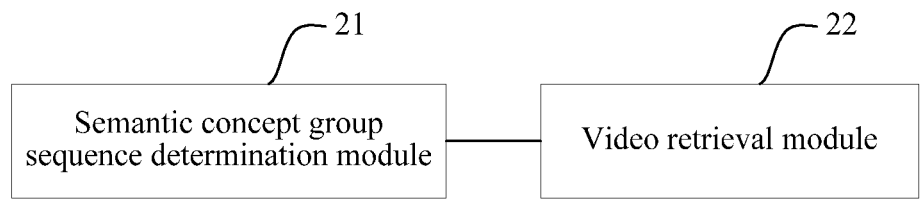
FIG. 2 is a logic block diagram of a first video retrieval apparatus according to an embodiment of the present application.

FIG. 2 is a logic block diagram of a first video retrieval apparatus according to an embodiment of the present application. As shown in FIG. 2, the video retrieval apparatus according to the embodiment of the present application comprises: a semantic concept group sequence determination module 21 and a video retrieval module 22.

The semantic concept group sequence determination module 21 is configured to determine a semantic concept group sequence according to video query information, the semantic concept group sequence comprising: at least two semantic concept groups and sequential information between different semantic concept groups therein, and each semantic concept group in the at least two semantic concept groups comprising at least one simple semantic concept.

The video retrieval module 22 is configured to retrieve videos at least according to the semantic concept group sequence.

The technical solution according to the embodiment of the present application determines the semantic concept group sequence according to the video query information, retrieves videos at least according to the semantic concept group sequence, and thus obtains, based on retrieval, a retrieval result that reflects an overall correlation degree of videos and the video query information including semantics and sequences. That is to say, the technical solution according to the embodiment of the present application jointly takes multiple semantics represented by the video query information and sequential information between the multiple semantics as a basis of video retrieval, wherein the sequential information embodies scene change and other information of retrieval objects to some extent, to cause the obtained retrieval result to embody an overall correlation degree between videos and the video query information including semantics and sequences, which helps to increase accuracy of the retrieval result and better meets actual application demands of complicated query of videos.

Device manifestations of the video retrieval apparatus are not limited, for example, the video retrieval apparatus may be a certain separate device; or the video retrieval apparatus may be integrated, as a certain functional module, into a certain electronic device, and the electronic device may comprise, but is not limited to, smart terminals, search engine devices, servers and the like, which is not limited in the embodiment of the present application.

Figure 3:
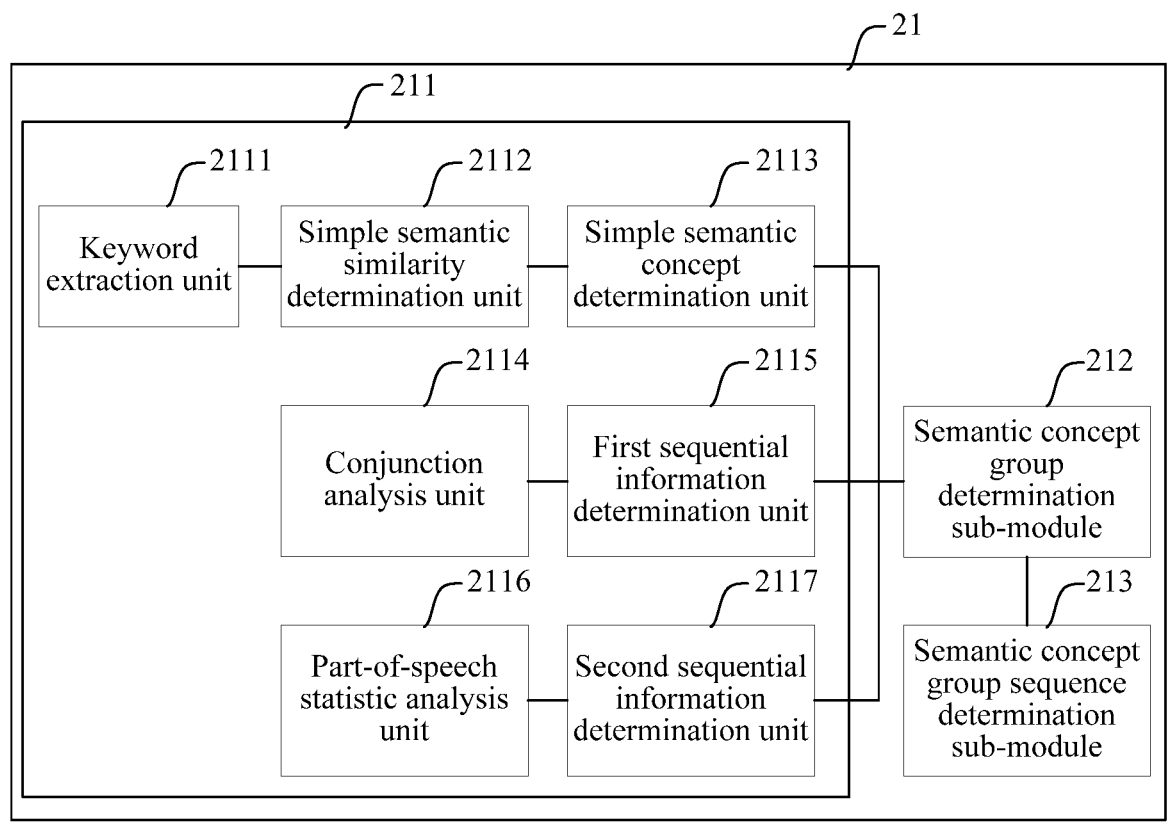
FIG. 3 is a logic block diagram of a semantic concept group sequence determination module according to an embodiment of the present application.

Optionally, as shown in FIG. 3, the semantic concept group sequence determination module 21 comprises: a simple semantic information determination sub-module 211, a semantic concept group determination sub-module 212 and a semantic concept group sequence determination sub-module 213. The simple semantic information determination sub-module 211 is configured to determine at least two simple semantic concepts and sequential information between different simple semantic concepts therein according to the video query information; the semantic concept group determination sub-module 212 is configured to determine the at least two semantic concept groups, wherein sequential information corresponding to simple semantic concepts comprised in the same semantic concept group in the at least two semantic concept groups is the same, and sequential information corresponding to simple semantic concepts comprised in different semantic concept groups are different; and the semantic concept group sequence determination sub-module 213 is configured to determine the semantic concept group sequence according to the at least two semantic concept groups and the sequential information between the different semantic concept groups therein. The scheme is equivalent to determining simple semantic concepts and corresponding sequential information thereof from the video query information and combining determined simple semantic concept groups into a semantic concept group according to the sequential information, in this way, the at least two semantic concept groups and the sequential information corresponding to the different semantic concept groups therein can be obtained, that is, the semantic concept group sequence is obtained, and the semantic concept group sequence is adopted for video retrieval, which helps to establish association between high-level semantics of the video query information and underlying information of video content, causes a retrieval result to be capable of reflecting the overall correlation degree of videos and the video query information including semantics and sequences, and thus increases accuracy of the retrieval result.

Optionally, the simple semantic information determination sub-module 211 comprises: a keyword extraction unit 2111, a simple semantic similarity determination unit 2112 and a simple semantic concept determination unit 2113. The keyword extraction unit 2111 is configured to extract at least two keywords according to the video query information; the simple semantic similarity determination unit 2112 is configured to determine semantic similarities between the video query information and multiple simple semantic concepts comprised in a simple semantic concept set respectively at least according to the at least two keywords; and the simple semantic concept determination unit 2113 is configured to determine the at least two simple semantic concepts whose semantic similarities meet a predetermined condition in the simple semantic concept set. The scheme can effectively extract semantic concepts in the video query information. Optionally, the keywords comprise content words, and as the content words have substantial meanings, extracting the content words in the video query information as keywords can better represent semantics of the video query information.

Optionally, the simple semantic information determination sub-module 211 comprises: a conjunction analysis unit 2114 and a first sequential information determination unit 2115. The conjunction analysis unit 2114 is configured to analyze conjunctions comprised in the video query information; and the first sequential information determination unit 2115 is configured to determine the sequential information of different simple semantic concepts in the at least two simple semantic concepts according to an analysis result of the conjunctions. The scheme is simple and easy to implement, and has an analysis result with high accuracy.

Optionally, the simple semantic information determination sub-module 211 comprises: a part-of-speech statistic analysis unit 2116 and a second sequential information determination unit 2117. The part-of-speech statistic analysis unit 2116 is configured to perform part-of-speech statistic analysis on different clauses comprised in the video query information respectively; and the second sequential information determination unit 2117 is configured to determine the sequential information of different simple semantic concepts in the at least two simple semantic concepts according to a part-of-speech statistic analysis result. The scheme can effectively extract implicit sequential information in the video query information.

Figure 4:
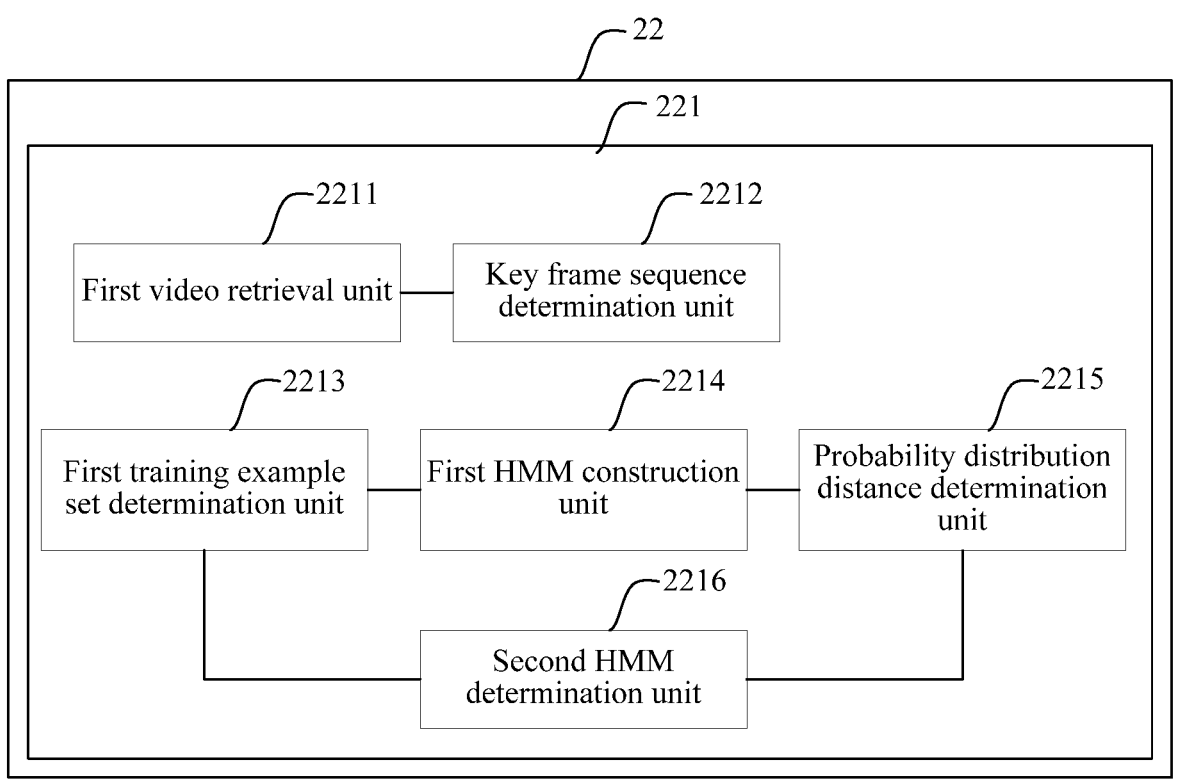
FIG. 4 is a logic block diagram of a video retrieval module according to an embodiment of the present application.

Optionally, as shown in FIG. 4, the video retrieval module 22 comprises: a video retrieval sub-module 221. The video retrieval sub-module 221 is configured to determine semantic similarities and sequential similarities between multiple videos comprised in a video library and the video query information at least according to the semantic concept group sequence, to obtain a retrieval result. The scheme, in a period of performing video retrieval on the video library, jointly takes multiple semantics represented by the video query information and sequential information between the multiple semantics as a basis of video retrieval, to cause the obtained retrieval result to not only embody semantic similarities between videos and the video query information but also embody sequential similarities between the videos and the video query information, that is, embody an overall correlation degree between the videos and the video query information including semantics and sequences, which helps to increase accuracy of the retrieval result and better meets actual application demands of complicated query of videos.

Optionally, the video retrieval sub-module 221 comprises: a first video retrieval unit 2211. The first video retrieval unit 2211 is configured to determine the semantic similarity and the sequential similarity between the any video and the video query information according to semantic similarities between respective key frames in a key frame sequence comprised in the any video in the video library and multiple semantic concept groups comprised in a semantic concept group set and/or multiple simple semantic concepts comprised in the simple semantic concept set, sequential information between multiple key frames comprised in the any video and the semantic concept group sequence. The scheme takes semantic similarities between a video in a video library and simple semantic concepts in a simple semantic concept set and/or semantic concept groups in a semantic concept group as intermediate features of video retrieval, and performs retrieval in combination with sequential information, to cause simple semantic concepts or semantic concept groups corresponding to different key frames of the video to establish an association therebetween, thus reducing a semantic gap between underlying features of the video and high-level semantics of the video query information and increasing accuracy of a video retrieval result.

Optionally, the video retrieval sub-module 221 further comprises: a key frame sequence determination unit 2212. The key frame sequence determination unit 2212 is configured to, before the first video retrieval unit determines the semantic similarity and the sequential similarity between the any video and the video query information, determine at least two adjacent key frames of the any video as a key frame sequence. Use of the scheme helps to determine key frame sequences with similar or the same lengths in videos of the video library as objects of similarity retrieval, unifies comparison standards, and thus helps to increase accuracy of a retrieval result.

Optionally, the video retrieval sub-module 221 comprises: a first training example set determination unit 2213, a first HMM construction unit 2214 and a probability distribution distance determination unit 2215. The first training example set determination unit 2213 is configured to determine a first training example set in the multiple videos comprised in the video library at least according to the semantic concept group sequence by using a heuristic method; the first HMM construction unit 2214 is configured to construct a first HMM corresponding to the video query information according to the first training example set; and the probability distribution distance determination unit 2215 is configured to determine probability distribution distances between second HMMs corresponding to the multiple videos comprised in the video library and the first HMM, to obtain the semantic similarities and the sequential similarities between the multiple videos comprised in the video library and the video query information. The scheme determines the semantic similarities and the sequential similarities between the multiple videos comprised in the video library and the video query information in a manner based on HMM modeling, thus helping to increase accuracy of the detection result. Optionally, the probability distribution distances comprise: KL divergence, so as to facilitate similarity measurement of two HMMs.

Optionally, the video retrieval sub-module 221 further comprises: a second HMM determination unit 2216. The second HMM determination unit 2216 is configured to, before the probability distribution distance determination unit determines a probability distribution distance between a second MINI corresponding to any video comprised in the video library and the first HMM, determine the second HMM corresponding to the any video according to semantic similarities between multiple key frames comprised in the any video in the video library and multiple semantic concept groups comprised in a semantic concept group set and/or multiple simple semantic concepts comprised in the simple semantic concept set and sequential information between the multiple key frames comprised in the any video. The scheme is simple and easy to implement, and after the video is indicated as a MINI (second HMM), it is convenient to measure a probability distribution distance with the first HMM corresponding to the complicated query information.

In the technical solution according to the embodiment of the present application, the simple semantic concept set, the semantic concept group set, and semantic relevance between multiple simple semantic concepts comprised in the simple semantic concept set and/or multiple semantic concept groups comprised in the semantic concept group set and key frames of the video may be pre-acquired, for example, it is feasible to use data of the video library already having the above information, or it is feasible to determine the semantic relevance before the corresponding video retrieval based on the video query information, which is not limited in the embodiment of the present application.

Figure 5:
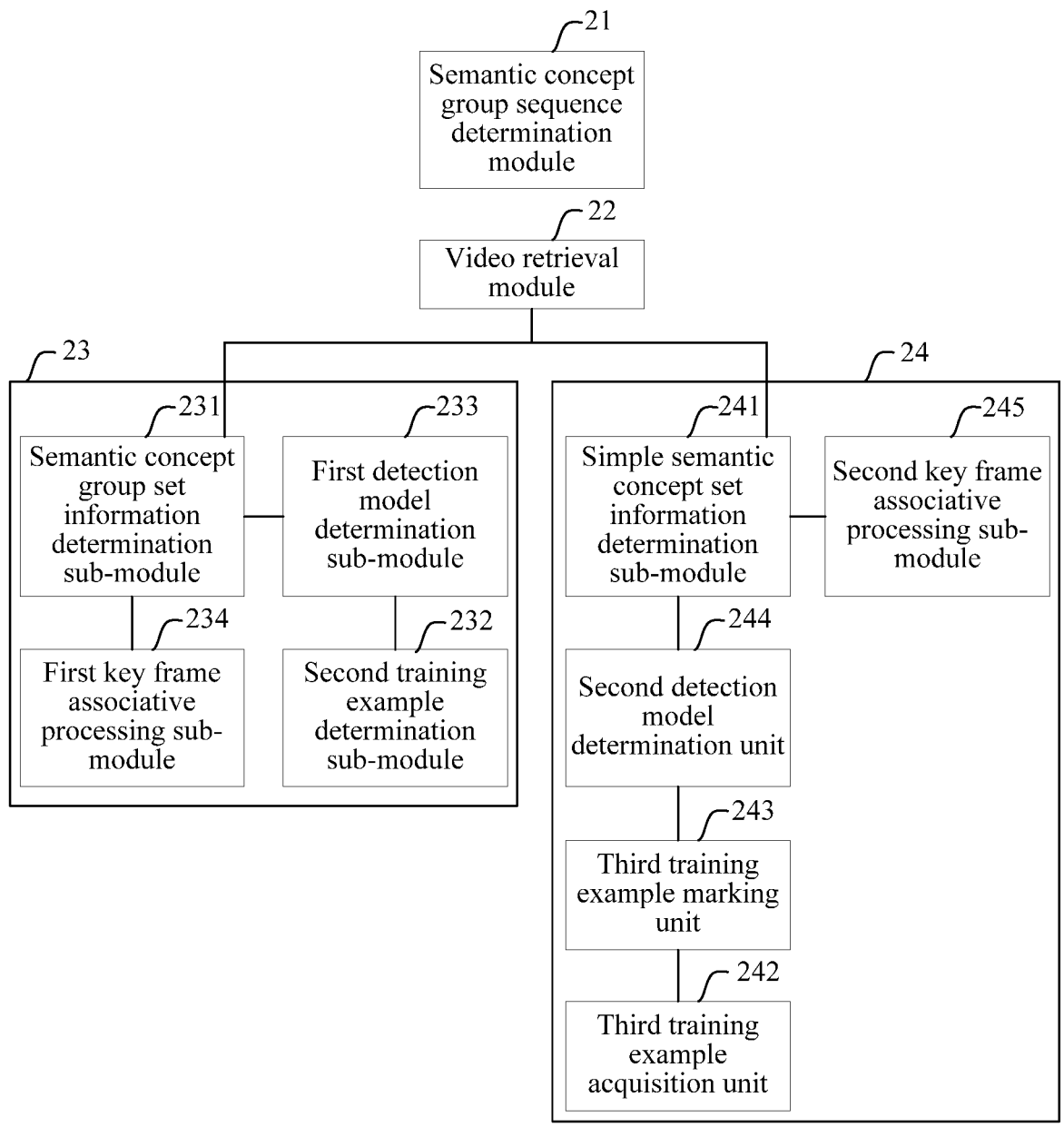
FIG. 5 is a logic block diagram of a second video retrieval apparatus according to an embodiment of the present application.

Optionally, as shown in FIG. 5, the video retrieval apparatus further comprises: a semantic concept group set information determination module 23. The semantic concept group set information determination module 23 is configured to determine semantic similarities between multiple videos comprised in the video library and multiple semantic concept groups comprised in a semantic concept group set. The scheme, before the corresponding video retrieval is performed based on the video query information, determines semantic similarities between multiple videos comprised in the video library and multiple semantic concept groups comprised in a semantic concept group set, and thus the semantic similarities can be taken as intermediate features of subsequently retrieving the videos according to the semantic concept group sequence, thereby increasing the speed of video online retrieval.

Optionally, the semantic concept group set information determination module 23 comprises: a semantic concept group set information determination sub-module 231. The semantic concept group set information determination sub-module 231 is configured to, in a period of determining semantic similarities between multiple videos comprised in the video library and any semantic concept group comprised in the semantic concept group set, detect multiple key frames of the multiple videos comprised in the video library respectively by using a semantic concept group classification and detection model corresponding to any semantic concept group comprised in the semantic concept group set, to obtain semantic similarities between the multiple key frames of the multiple videos and the any semantic concept group. The semantic similarities obtained in the scheme are taken as intermediate features of subsequently retrieving the videos according to the semantic concept group sequence, thereby increasing the speed of video online retrieval.

Optionally, the semantic concept group set information determination module 23 further comprises: a second training example determination sub-module 232 and a first detection model determination sub-module 233. The second training example determination sub-module 232 is configured to determine multiple marked second training examples from semantic similarities between respective key frames comprised in multiple videos of at least one data source and multiple simple semantic concepts comprised in the simple semantic concept set; and determine unmarked second training examples from the multiple videos comprised in the video library; and the first detection model determination sub-module 233 is configured to determine a semantic concept group classification and detection model of the any semantic concept group according to each second training example. The scheme can enrich data sources of example acquisition, and can combine a small number of precisely marked examples and unmarked examples into a training example set of a semantic concept group classification and detection model, which helps to use a less amount of processing to acquire a detector with higher performance.

Optionally, the semantic concept group set information determination module 23 further comprises: a first key frame associative processing sub-module 234. The first key frame associative processing sub-module 234 is configured to perform associative processing on multiple adjacent key frames according to semantic similarities between the multiple adjacent key frames comprised in the any video and the any semantic concept group. When intermediate features of the semantic concept group sequence are retrieved based on a semantic similarity between the video and the semantic concept group, it is feasible to take the associated multiple key frames as a whole for comparison, to increase the speed of retrieval.

Optionally, the video retrieval apparatus further comprises: a simple semantic concept set information determination module 24. The simple semantic concept set information determination module 24 is configured to determine semantic similarities between multiple videos comprised in the video library and multiple simple semantic concepts comprised in the simple semantic concept set. The scheme, before the corresponding video retrieval is performed based on the video query information, determines semantic similarities between multiple videos comprised in the video library and multiple simple semantic concepts comprised in the simple semantic concept set, and thus can take the semantic similarities as intermediate features of subsequently retrieving the videos according to the semantic concept group sequence, thereby increasing the speed of video online retrieval.

Optionally, the simple semantic concept set information determination module 24 comprises: a simple semantic concept set information determination sub-module 241. The simple semantic concept set information determination sub-module 241 is configured to, in a period of determining semantic similarities between multiple videos comprised in the video library and any simple semantic concept comprised in the simple semantic concept set, detect multiple key frames of the multiple videos comprised in the video library respectively by using a simple semantic concept classification and detection model corresponding to the any simple semantic concept comprised in the simple semantic concept set, to obtain semantic similarities between the multiple key frames of the multiple videos and the any simple semantic concept. The semantic similarities obtained in the scheme can be taken as intermediate features of subsequently retrieving the videos according to the semantic concept group sequence, thereby increasing the speed of video online retrieval.

Optionally, the simple semantic concept set information determination module 24 comprises: a third training example acquisition unit 242, a third training example marking unit 243 and a second detection model determination unit 244. The third training example acquisition unit 242 is configured to acquire multiple third training examples of the any simple semantic concept from at least one data source; the third training example marking unit 243 is configured to mark at least part of the multiple third training examples; and the second detection model determination unit 244 is configured to determine the simple semantic concept classification and detection model corresponding to the any simple semantic concept according to the at least part of the multiple third training examples marked. The scheme can enrich data sources of example acquisition, and can combine a small number of precisely marked examples and unmarked examples into a training example set of a simple semantic concept classification and detection model, which helps to use a less amount of processing to acquire a detector with higher performance.

Optionally, the simple semantic concept set information determination module 24 further comprises: a second key frame associative processing sub-module 245. The second key frame associative processing sub-module 245 is configured to perform associative processing on multiple adjacent key frames according to semantic similarities between the multiple adjacent key frames comprised in the any video and the any simple semantic concept. When semantic concept group modeling is performed and/or intermediate features of the semantic concept group sequence are retrieved based on a semantic similarity between the video and the simple semantic concept, it is feasible to take the associated multiple key frames as a whole for comparison, to increase the speed of retrieval.

Figure 6:
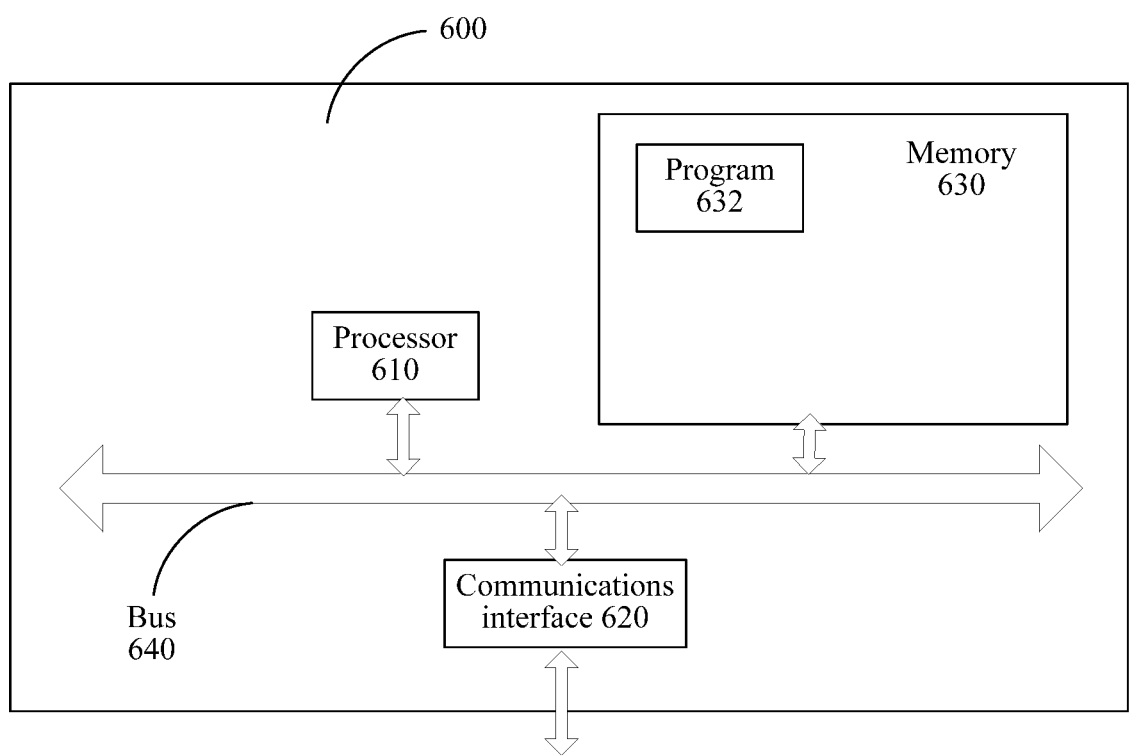
FIG. 6 is a logic block diagram of a third video retrieval apparatus according to an embodiment of the present application.

FIG. 6 is a logic block diagram of a third video retrieval apparatus according to an embodiment of the present application; the specific embodiment of the present application does not limit specific implementation of the video retrieval apparatus 600. As shown in FIG. 6, the video retrieval apparatus 600 may comprise:

a processor 610, a Communications Interface 620, a memory 630, and a communications bus 640.

The processor 610, the Communications Interface 620, and the memory 630 accomplish mutual communications via the communications bus 640.

The Communications Interface 620 is configured to communicate with, for example, terminals, third-party devices, information sources and the like.

The processor 610 is configured to execute a program 632, and specifically, can implement relevant steps in the any above video retrieval method embodiment.

For example, the program 632 may comprise a program code, the program code comprising a computer operation instruction.

The processor 610 may be a central processing unit (CPU), or an application specific integrated circuit (ASIC), or be configured to be one or more integrated circuits which implement the embodiments of the present application.

The memory 630 is configured to store the program 632. The memory 630 may comprise a Random Access Memory (RAM), and may also comprise a Non-volatile memory, for example, at least one magnetic disk memory.

For example, in one optional implementation, the processor 610 may perform the following steps by executing the program 632: determining a semantic concept group sequence according to video query information, the semantic concept group sequence comprising: at least two semantic concept groups and sequential information between different semantic concept groups therein, and each semantic concept group in the at least two semantic concept groups comprising at least one simple semantic concept; and retrieving videos at least according to the semantic concept group sequence. In other optional implementations, the processor 610 may also perform the steps mentioned in any other embodiments described above by executing the program 632, which is no longer repeated herein.

Reference can be made to corresponding description in the corresponding steps, modules, sub-modules and units in the embodiments for specific implementation of the steps in the program 632, which is not repeated herein. Those skilled in the art can clearly understand that, reference can be made to the corresponding process description in the method embodiments for the specific working procedures of the devices and the modules described above, and will not be repeated herein in order to make the description convenient and concise.

In the embodiments of the present application, the serial numbers and/or the sequence of the embodiments are merely for the convenience of description, and do not imply the preference among the embodiments. The description about each embodiment has its own focus, and reference can be made to related description of other embodiments for the part not detailed in a certain embodiment.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

In the embodiments of the apparatuses, methods and systems of the present application, it is apparent that the members (systems, sub-systems, modules, sub-modules, units, sub-units, and the like) or the steps can be decomposed, combined and/or recombined after decomposition. The decomposition and/or recombination should be regarded as equivalent solutions of the present application. Moreover, in the description about the embodiments of the present application, features described and/or illustrated with respect to one implementation may be used in one or more other implementations in the same or a similar manner, be combined with features in other implementations, or replace the features in other implementations.

It should be emphasized that, the term "comprise" used herein refers to existence of features, elements, steps or components, but does not exclude existence or addition of one or more other features, elements, steps or components.

Finally, it should be noted that, the above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A video retrieval method, comprising:
receiving video query information;
determining a semantic concept group sequence according to the video query information, the semantic concept group sequence comprising at least two semantic concept groups and group sequential information between the at least two semantic concept groups, and each semantic concept group in the at least two semantic concept groups comprising at least one simple semantic concept;
wherein the determining a semantic concept group sequence according to video query information comprises:
determining at least two simple semantic concepts and concept sequential information between the at least two simple semantic concepts according to the video query information;
wherein determining the concept sequential information between the at least two simple semantic concepts according to the video query information comprises:
analyzing conjunctions comprised in the video query information; and
determining the concept sequential information of different simple semantic concepts in the at least two simple semantic concepts according to an analysis result of the conjunctions;
clustering simple semantic concepts corresponding to a first concept sequential information into a first semantic concept group, and clustering simple semantic concepts corresponding to a second concept sequential information into a second semantic concept group to obtain the at least two semantic concept groups, wherein the at least two semantic concept groups comprise the first semantic concept group and the second semantic concept group; and
determining the semantic concept group sequence according to the at least two semantic concept groups and the group sequential information between the at least two semantic concept groups; and
retrieving videos at least according to the semantic concept group sequence.

2. The method of claim 1, wherein the determining at least two simple semantic concepts according to the video query information comprises:
extracting at least two keywords according to the video query information;
determining semantic similarities between the video query information and multiple simple semantic concepts comprised in a simple semantic concept set at least according to the at least two keywords; and
determining the at least two simple semantic concepts whose semantic similarities meet a predetermined condition in the simple semantic concept set.

3. The method of claim 2, wherein the keywords comprise content words.

4. The method of claim 1, wherein the determining concept sequential information between the at least two simple semantic concepts according to the video query information comprises:
performing part-of-speech statistic analysis on different clauses comprised in the video query information; and
determining the concept sequential information between the at least two simple semantic concepts according to a part-of-speech statistic analysis result.

5. The method of claim 1, wherein the retrieving videos at least according to the semantic concept group sequence comprises:
determining semantic similarities and sequential similarities between multiple videos comprised in a video library and the video query information at least according to the semantic concept group sequence, to obtain a retrieval result.

6. The method of claim 5, wherein the determining semantic similarities and sequential similarities between multiple videos comprised in a video library and the video query information at least according to the semantic concept group sequence comprises:
determining a semantic similarity and a sequential similarity between a video and the video query information according to frame semantic similarities and frame sequential information, wherein the frame semantic similarities exist between respective key frames in a key frame sequence comprised in the video in the video library and multiple semantic concept groups comprised in a semantic concept group set and/or multiple simple semantic concepts comprised in the simple semantic concept set, and wherein the frame sequential information indicates a sequence between multiple key frames comprised in the video.

7. The method of claim 6, wherein, before the determining the semantic similarity and the sequential similarity between the video and the video query information, the method further comprises:
determining at least two adjacent key frames of the video as a key frame sequence.

8. The method of claim 5, wherein the determining semantic similarities and sequential similarities between multiple videos comprised in a video library and the video query information at least according to the semantic concept group sequence comprises:
determining a first training example set in the multiple videos comprised in the video library at least according to the semantic concept group sequence by using a heuristic method;
constructing a first Hidden Markov Model (HMM) corresponding to the video query information according to the first training example set; and
determining probability distribution distances between second HMMs corresponding to the multiple videos comprised in the video library and the first HMM, to obtain the semantic similarities and the sequential similarities between the multiple videos comprised in the video library and the video query information.

9. The method of claim 8, wherein the probability distribution distances comprise KL divergence.

10. The method of claim 8, further comprising:
determining a second HMM corresponding to a video according to frame semantic similarities and frame sequential information, wherein the frame semantic similarities exist between multiple key frames comprised in the video in the video library and multiple semantic concept groups comprised in a semantic concept group set and/or multiple simple semantic concepts comprised in the simple semantic concept set, and wherein the frame sequential information indicates a sequence between the multiple key frames comprised in the video.

11. The method of claim 1, wherein, before the retrieving videos at least according to the semantic concept group sequence, the method further comprises:
determining semantic similarities between multiple videos comprised in a video library and multiple semantic concept groups comprised in a semantic concept group set.

12. The method of claim 11, wherein the determining semantic similarities between multiple videos comprised in the video library and the multiple semantic concept group comprised in the semantic concept group set comprises:
detecting multiple key frames of the multiple videos comprised in the video library by using a semantic concept group classification and detection model corresponding to a first semantic concept group comprised in the semantic concept group set, to obtain frame semantic similarities between the multiple key frames of the multiple videos and the first semantic concept group.

13. The method of claim 12, wherein, before the detecting multiple key frames of the multiple videos comprised in the video library by using a semantic concept group classification and detection model corresponding to a semantic concept group comprised in the semantic concept group set, the method further comprises:
determining multiple marked second training examples from semantic similarities between respective key frames comprised in multiple videos of at least one data source and multiple simple semantic concepts comprised in the simple semantic concept set;
determining unmarked second training examples from the multiple videos comprised in the video library; and
determining the semantic concept group classification and detection model of the semantic concept group according to the marked second training examples and the unmarked second training examples.

14. The method of claim 12, wherein, after the detecting multiple key frames of a video comprised in the video library by using a semantic concept group classification and detection model corresponding to a semantic concept group comprised in the semantic concept group set, the method further comprises:
performing associative processing on multiple adjacent key frames according to semantic similarities between the multiple adjacent key frames comprised in the video and the semantic concept group.

15. The method of claim 1, wherein, before the retrieving videos at least according to the semantic concept group sequence, the method further comprises:
determining semantic similarities between multiple videos comprised in a video library and multiple simple semantic concepts comprised in the simple semantic concept set.

16. The method of claim 15, wherein the determining semantic similarities between multiple videos comprised in the video library and the multiple simple semantic concept comprised in the simple semantic concept set comprises:
detecting multiple key frames of the multiple videos comprised in the video library by using a simple semantic concept classification and detection model corresponding to a first simple semantic concept comprised in the simple semantic concept set, to obtain frame semantic similarities between the multiple key frames of the multiple videos and the first simple semantic concept.

17. The method of claim 16, wherein, before the detecting multiple key frames of a video comprised in the video library by using a simple semantic concept classification and detection model corresponding to a simple semantic concept comprised in the simple semantic concept set, the method further comprises:
acquiring multiple third training examples of the simple semantic concept from at least one data source;
marking at least part of the multiple third training examples; and
determining the simple semantic concept classification and detection model corresponding to the simple semantic concept according to the marked at least part of the multiple third training examples.

18. The method of claim 16, wherein, after the detecting multiple key frames of a video comprised in the video library by using a simple semantic concept classification and detection model corresponding to the simple semantic concept comprised in the simple semantic concept set, the method further comprises:
performing associative processing on multiple adjacent key frames according to semantic similarities between the multiple adjacent key frames comprised in the video and the simple semantic concept.

19. A video retrieval apparatus, comprising:
a semantic concept group sequence determination module, configured to receive video query information and determine a semantic concept group sequence according to the video query information, the semantic concept group sequence comprising at least two semantic concept groups and group sequential information between the at least two semantic concept groups, and each semantic concept group in the at least two semantic concept groups comprising at least one simple semantic concept; and a video retrieval module, configured to retrieve videos at least according to the semantic concept group sequence;

wherein the semantic concept group sequence determination module comprises:

a simple semantic information determination sub-module, configured to determine at least two simple semantic concepts and concept sequential information between the at least two simple semantic concepts according to the video query information;

wherein the simple semantic information determination sub-module is configured to determine the concept sequential information by analyzing conjunctions comprised in the video query information and determining the concept sequential information of different simple semantic concepts in the at least two simple semantic concepts according to an analysis result of the conjunctions;

a semantic concept group determination sub-module, configured to cluster simple semantic concepts corresponding to a first concept sequential information into a first semantic concept group, and cluster simple semantic concepts corresponding to a second sequential information into a second semantic concept group to obtain the at least two semantic concept groups, wherein the at least two semantic concept groups comprise the first semantic concept group and the second semantic concept group; and a semantic concept group sequence determination sub-module, configured to determine the semantic concept group sequence according to the at least two semantic concept groups and the group sequential information between the at least two semantic concept groups.

20. A non-transitory computer readable storage apparatus, comprising at least one executable instruction, which, in response to execution, causes a video retrieval apparatus to perform operations-comprising:

receiving video query information;

determining a semantic concept group sequence according to the video query information, the semantic concept group sequence comprising at least two semantic concept groups and group sequential information between the at least two semantic concept groups, and each semantic concept group in the at least two semantic concept groups comprising at least one simple semantic concept;

wherein the determining a semantic concept group sequence according to video query information comprises:

determining at least two simple semantic concepts and concept sequential information between the at least two simple semantic concepts according to the video query information;

wherein determining the concept sequential information between the at least two simple semantic concepts according to the video query information comprises:

analyzing conjunctions comprised in the video query information; and determining the concept sequential information of different simple semantic concepts in the at least two simple semantic concepts according to an analysis result of the conjunctions;

clustering simple semantic concepts corresponding to a first concept sequential information into a first semantic concept group, and clustering simple semantic concepts corresponding to a second concept sequential information into a second semantic concept group to obtain the at least two semantic concept groups, wherein the at least two semantic concept groups comprise the first semantic concept group and the second semantic concept group; and determining the semantic concept group sequence according to the at least two semantic concept groups and the group sequential information between the at least two semantic concept groups; and retrieving videos at least according to the semantic concept group sequence.

21. A video retrieval apparatus, comprising:

a processor, a communication interface, a memory and a communication bus;

wherein the processor, the communication interface, and the memory communicate with each other by the communication bus;

the memory is configured to store at least one command; and the at least one command causes the processor to execute operations comprising:

receiving video query information;

determining a semantic concept group sequence according to the video query information, the semantic concept group sequence comprising at least two semantic concept groups and group sequential information between the at least two semantic concept groups, and each semantic concept group in the at least two semantic concept groups comprising at least one simple semantic concept;

wherein the determining a semantic concept group sequence according to video query information comprises:

determining at least two simple semantic concepts and concept sequential information between the at least two simple semantic concepts according to the video query information;

wherein determining the concept sequential information between the at least two simple semantic concepts according to the video query information comprises:

analyzing conjunctions comprised in the video query information; and determining the concept sequential information of different simple semantic concepts in the at least two simple semantic concepts according to an analysis result of the conjunctions;

clustering simple semantic concepts corresponding to a first concept sequential information into a first semantic concept group, and clustering simple semantic concepts corresponding to a second concept sequential information into a second semantic concept group to obtain the at least two semantic concept groups, wherein the at least two semantic concept groups comprise the first semantic concept group and the second semantic concept group; and determining the semantic concept group sequence according to the at least two semantic concept groups and the group sequential information between the at least two semantic concept groups; and retrieving videos at least according to the semantic concept group sequence.

22. The apparatus of claim 21, wherein the operations further comprise:
extracting at least two keywords according to the video query information;
determining semantic similarities between the video query information and multiple simple semantic concepts comprised in a simple semantic concept set at least according to the at least two keywords; and
determining the at least two simple semantic concepts whose semantic similarities meet a predetermined condition in the simple semantic concept set.

23. The apparatus of claim 22, wherein the keywords comprise content words.

24. The apparatus of claim 21, wherein the operations further comprise:
performing part-of-speech statistic analysis on different clauses comprised in the video query information; and
determining the concept sequential information between the at least two simple semantic concepts according to a part-of-speech statistic analysis result.

25. The apparatus of claim 21, wherein the operations further comprise:
determining semantic similarities and sequential similarities between multiple videos comprised in a video library and the video query information at least according to the semantic concept group sequence, to obtain a retrieval result.

26. The apparatus of claim 25, wherein the operations further comprise:
determining a semantic similarity and a sequential similarity between a video and the video query information according to frame semantic similarities and frame sequential information, wherein the frame semantic similarities exist between respective key frames in a key frame sequence comprised in the video in the video library and multiple semantic concept groups comprised in a semantic concept group set and/or multiple simple semantic concepts comprised in the simple semantic concept set, and wherein the frame sequential information indicates a sequence between multiple key frames comprised in the video and the semantic concept group sequence.

27. The apparatus of claim 26, wherein the operations further comprise:
determining the semantic similarity and the sequential similarity between the video and the video query information, determining at least two adjacent key frames of the video as a key frame sequence.

28. The apparatus of claim 25, wherein the operations further comprise:
determining a first training example set in the multiple videos comprised in the video library at least according to the semantic concept group sequence by using a heuristic method;
constructing a first Hidden Markov Model (HMM) corresponding to the video query information according to the first training example set; and
determining probability distribution distances between second HMMs corresponding to the multiple videos comprised in the video library and the first HMM, to obtain the semantic similarities and the sequential similarities between the multiple videos comprised in the video library and the video query information.

29. The apparatus of claim 28, wherein the probability distribution distances comprise KL divergence.

30. The apparatus of claim 28, wherein the operations further comprise:
determining a second HMM corresponding to a video according to frame semantic similarities and frame sequential information, wherein the frame semantic similarities exist between multiple key frames comprised in the video in the video library and multiple semantic concept groups comprised in a semantic concept group set and/or multiple simple semantic concepts comprised in the simple semantic concept set, and wherein the frame sequential information indicates a sequence between the multiple key frames comprised in the video.

31. The apparatus of claim 21, wherein the operations further comprise:
determining semantic similarities between multiple videos comprised in a video library and multiple semantic concept groups comprised in a semantic concept group set.

32. The apparatus of claim 31, wherein the operations further comprise:
in a period of determining semantic similarities between multiple videos comprised in the video library and multiple semantic concept group comprised in the semantic concept group set, detecting multiple key frames of the multiple videos comprised in the video library by using a semantic concept group classification and detection model corresponding to a first semantic concept group comprised in the semantic concept group set, to obtain frame semantic similarities between the multiple key frames of the multiple videos and the first semantic concept group.

33. The apparatus of claim 32, wherein the operations further comprise:
determining multiple marked second training examples from semantic similarities between respective key frames comprised in multiple videos of at least one data source and multiple simple semantic concepts comprised in the simple semantic concept set; and determine unmarked second training examples from the multiple videos comprised in the video library; and
determining the semantic concept group classification and detection model of the semantic concept group according to the marked second training examples and the unmarked second training examples.

34. The apparatus of claim 32, wherein the operations further comprise:
performing associative processing on multiple adjacent key frames according to semantic similarities between the multiple adjacent key frames comprised in the video and the semantic concept group.

35. The apparatus of claim 21, wherein the operations further comprise:
determining semantic similarities between multiple videos comprised in a video library and multiple simple semantic concepts comprised in the simple semantic concept set.

36. The apparatus of claim 35, wherein the operations further comprise:
in a period of determining semantic similarities between multiple videos comprised in the video library and multiple simple semantic concept comprised in the simple semantic concept set, detecting multiple key frames of the multiple videos comprised in the video library by using a simple semantic concept classification and detection model corresponding to a first simple semantic concept comprised in the simple semantic concept set, to obtain frame semantic similarities between the multiple key frames of the multiple videos and the first simple semantic concept.

37. The apparatus of claim 36, wherein the operations further comprise:
   acquiring multiple third training examples of the simple semantic concept from at least one data source;
   marking at least part of the multiple third training examples; and
   determining the simple semantic concept classification and detection model corresponding to the simple semantic concept according to the marked at least part of the multiple third training examples.

38. The apparatus of claim 36, wherein the operations further comprise:
   performing associative processing on multiple adjacent key frames according to semantic similarities between the multiple adjacent key frames comprised in the video and the simple semantic concept.

* * * * *